United States Patent [19]

Hazdra et al.

[11] 4,051,040

[45] Sept. 27, 1977

[54] ANTITHROMBOGENIC HEMO DIALYSIS MEMBRANES

[75] Inventors: James J. Hazdra, Downers Grove; David J. Rausch, Naperville, both of Ill.; Karl O. Munninger, North Las Vegas, Nev.

[73] Assignee: John L. Hutchinson, Wheaton, Ill. ; a part interest

[21] Appl. No.: 667,539

[22] Filed: Mar. 17, 1976

[51] Int. Cl.$^2$ .............................................. B01D 13/00
[52] U.S. Cl. ............................. 210/321 B; 210/500 M
[58] Field of Search .............. 210/500 M, 490, 321 R, 210/321 B; 536/97, 98

[56] References Cited

U.S. PATENT DOCUMENTS

| | | | |
|---|---|---|---|
| 3,723,413 | 3/1973 | Chatterjec et al. | 536/98 |
| 3,900,463 | 8/1975 | Yada et al. | 536/98 |

*Primary Examiner*—Wilbur L. Bascombe, Jr.
*Assistant Examiner*—E. Rollins Cross
*Attorney, Agent, or Firm*—John L. Hutchinson

[57] ABSTRACT

The present invention involves the partial carboxymethylation of cellulose to provide antithrombogenic characteristics when used as a hemo dialysis membrane. Partial carboxymethylation is obtained by reacting cellulose with an alkali chloroacetate.

4 Claims, No Drawings

ANTITHROMBOGENIC HEMO DIALYSIS MEMBRANES

DISCLOSURE OF INVENTION

The action of the human kidney in cleansing the blood must be undertaken by external dialysis in those situations where the kidney does not function properly. Such external dialysis is accomplished by means of artificial kidney machines containing special dialysis membranes, generally of from about 0.01 to 0.1 mm. in thickness. Blood is withdrawn from the body, passed through a series of cells formed by the membranes, which are capable of removing blood impurities by selective osmosis, and then the blood is returned to the body.

In any such artificial hemo dialysis, it is desirable that the membrane and associated equipment approach as closely as possible the characteristics of the body to avoid the initiation of blood coagulation or clotting. However, such characteristics are difficult to achieve and, accordingly, an agent such as heparin is generally added to the blood of a patient undergoing external hemo dialysis to reduce the tendency for clotting.

The properties of a dialysis membrane are critical due to its continual contact with the blood. In particular, such a membrane should not have a tendency to alter the natural characteristics of the blood, should not be toxic or tend to cause an allergy or hypertension. Cellulose based materials, such as cellophane or regenerated cellulose, have been found to offer minimum difficulties as to latering blood characteristics and also may be readily fabricated into desired membranes. Cellulosic based membranes have excellent diffusion properties necessary to permit separation of blood impurities from the blood by selective osmosis.

However, while cellulose offers one of the better materials for dialysis membranes, it does have a tendency to induce coagulation in the blood and, accordingly, the use of an agent, such as the above mentioned heparin, is usually necessary as a blood additive during hemo dialysis to inhibit clotting. It has been recognized that to some extent certain types of modified cellulose may have antithrombogenic properties. In this connection, reference may be made to Nemchin, et al, in the paper entitled, "Anionic Cellulose: A Potential Blood Compatible Material", 1969. However, such disclosures are not concerned with the specific problems of hemo dialysis and their solution as disclosed and claimed herein.

It has now been found that the blood clotting or thrombogenic tendency of cellulose used in hemo dialysis membranes can be substantially eliminated by subjecting the cellulose to partial carboxymethylation. In addition, it has been found that partial carboxymethylation of a cellulose membrane also improves its porosity, and correspondingly, its dialysis characteristics without affecting the overall mechanical properties required of the membrane.

In the partial carboxymethylation process contemplated by the present invention, the cellulose base should initially be treated to remove any glycerin which is frequently present for the purpose of rendering the base pliable or non-brittle. Such treatment is preferably accomplished by subjecting the base to a dilute solution of sodium bicarbonate followed by a rinse with distilled water.

After washing, the cellulose is then subjected to a reaction with a 15 – 40% solution of an alkali salt of chloroacetic acid for from about an hour and a half to two hours and a half at a temperature of between 32° – 37° C. Preferably, the reaction should involve about a 25% solution of sodium chloroacetate, a temperature of about 35° C. and a time of approximately 2 hours. Following the reaction of the cellulose with the alkali chloroacetate, the treated cellulose is then subjected to a solution of an alkali hydroxide such as sodium hydroxide. Generally, this treatment should extend for about 2 hours at a temperature of approximately 75° C. The cellulose is then washed under slightly alkaline conditions, preferably, at a pH of about 7.4 and prepared for storage. It may then be reglycerated to improve pliability. Further details as to the general process for carboxymethylation of cellulose may be found in the publication Polymers and Resins, Golding, copyright 1959.

A process of the above type results in partial carboxymethylation of cellulose of between 5 – 12% of that theoretically possible. Preferably, the carboxymethylated cellulose should contain between about 8 – 10% alkali carboxymethyl groups. If the carboxymethylation is less than 5% the antithrombogenic properties are appreciably reduced. Above about 12% carboxymethylation cellulose membranes rapidly tend to lose mechanical strength.

It is normally necessary to complete the reaction, as indicated, with the alkali solution treatment to neutralize any acidity and to insure the presence of the alkali salt of the carboxymethylated groups on the cellulose. If the carboxymethylated cellulose is acidic, it will be found to establish a thrombogenic effect rather than the desired antithrombogenic characteristics.

By way of an example of a more detailed process for producing the desired product a tube of cellulose of about .02 mil thickness and an I.D. of 4 mm. was initially washed twice in a boiling 5% sodium bicarbonate solution then washed once in boiling distilled water. The tube was then subjected to a 25% sodium monochloroacetate solution at 35° C. for 2 hours. To the solution containing the tube was then added a 35% solution of sodium hydroxide and the tube in the solution allowed to stand for 18 hours at 35° C. The treated tube was then thoroughly washed with water and reglycerated with a 50% glycerol-water solution.

Using the Lee White clotting test, one end of the tube, prepared as above, was tied and into the pocket formed was inserted a human blood sample to the height of approximately an inch. The opposite end of the tube was then tied and the sample hand shaken at room temperature of about 25° C. A corresponding test was conducted in an untreated cellulose tube as a control and the following comparative data developed:

| Time | Control Membrane | Treated Membrane |
|---|---|---|
| 14 min. | first clot forms | no signs of clotting |
| 32 min. | blood noticeably thick | no signs of clotting |
| 88 min. | black blood clot forms blood very thick | no visible clots blood still fluid |
| 150 min. | blood thick and very dark | no clotting, blood red |
| 170 min. | approx. half blood clotted blood no longer fluid | no clotting |
| 190 min. | massive clot forms | no clotting |
| 240 min. | complete clot, no fluid movement at all | blood thickening, small clot |
| 480 min. | | 25% clotted, still fluid |
| 570 min. | | 50% clotted, still fluid |

It has been found that the partially carboxymethylated cellulose membranes of the present invention can delay any significant coagulation of human blood for over eight hours and for over three hours with canine blood. As previously indicated, the partial carboxymethylation also improves the dialysis characteristics apparently by increasing pore size of membranes. Improved dialysis rates of up to about 10% have been noted in partially carboxymethylated cellulose membranes of the type contemplated by the present invention.

While the example has indicated partial carboxymethylation of both sides of a proposed membrane, it is understood that only one side may be so treated where such treated side is the one in contact with blood undergoing hemo dialysis. Alternately, the carboxymethylation may also be undertaken on membranes in position in cells by passing the carboxymethylation reactants in solution through such cells.

Having described the invention and certain embodiments, the same is only intended to be limited by the scope of the following claims.

We claim:

1. An artificial kidney machine having a hemo dialysis cellulosic membrane containing alkali carboxymethylation to the extent of about 5 – 12 percent of that alkali carboxymethylation which may be theoretically incorporated in said membrane.

2. A cell for subjecting blood to dialysis having a cellulosic dialysis surface containing alkali carboxymethylation to the extent of about 5-12 percent of that alkali carboxymethylation which may be theoretically incorporated into said surface.

3. A cell as described in claim 2 wherein said surface contains alkali carboxymethylation to the extent of about 8-10 percent.

4. A cell as described in claim 2 wherein said alkali carboxymethylation groups are sodium carboxymethylation groups.

* * * * *